Patented Aug. 16, 1927.

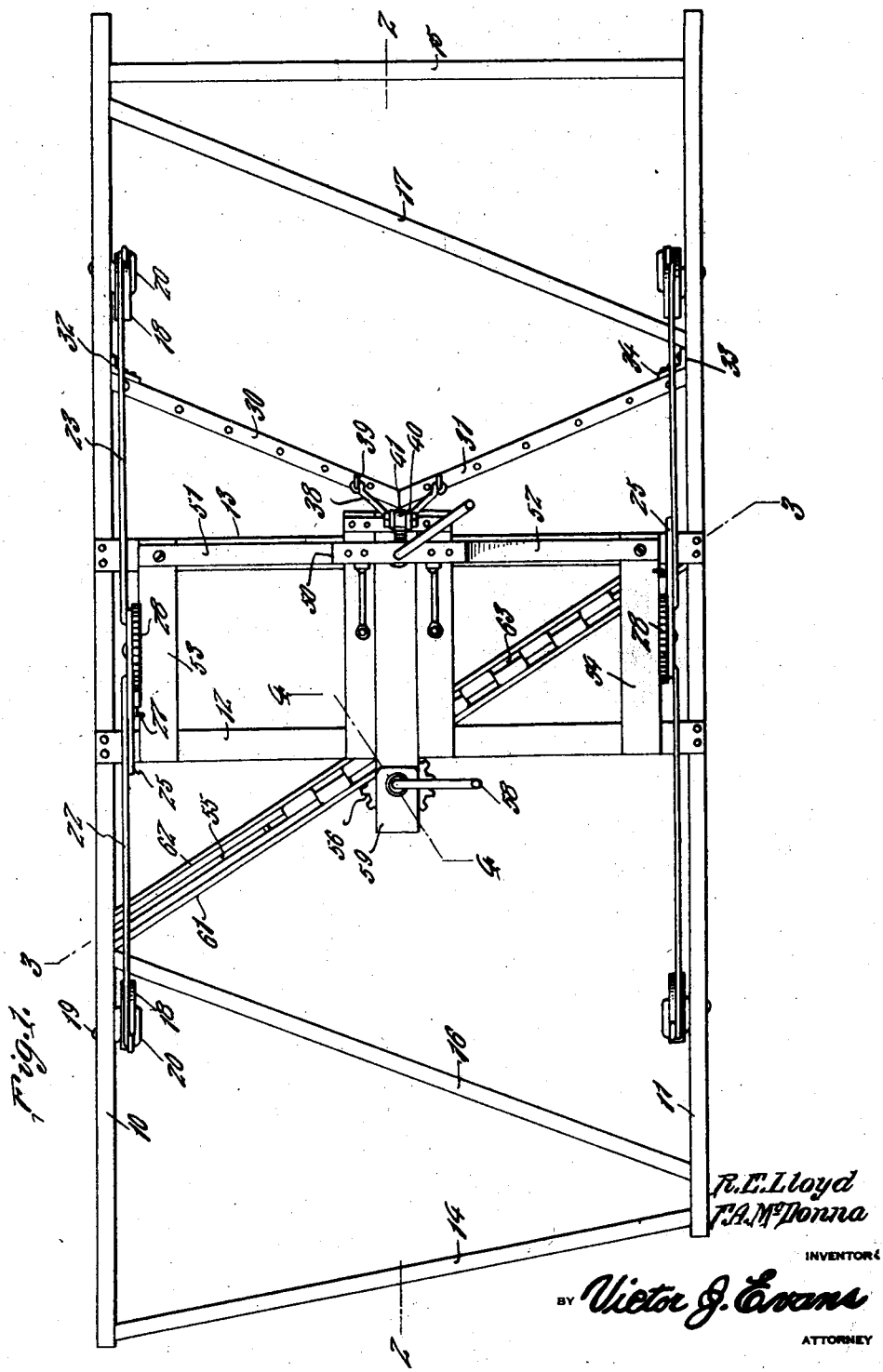

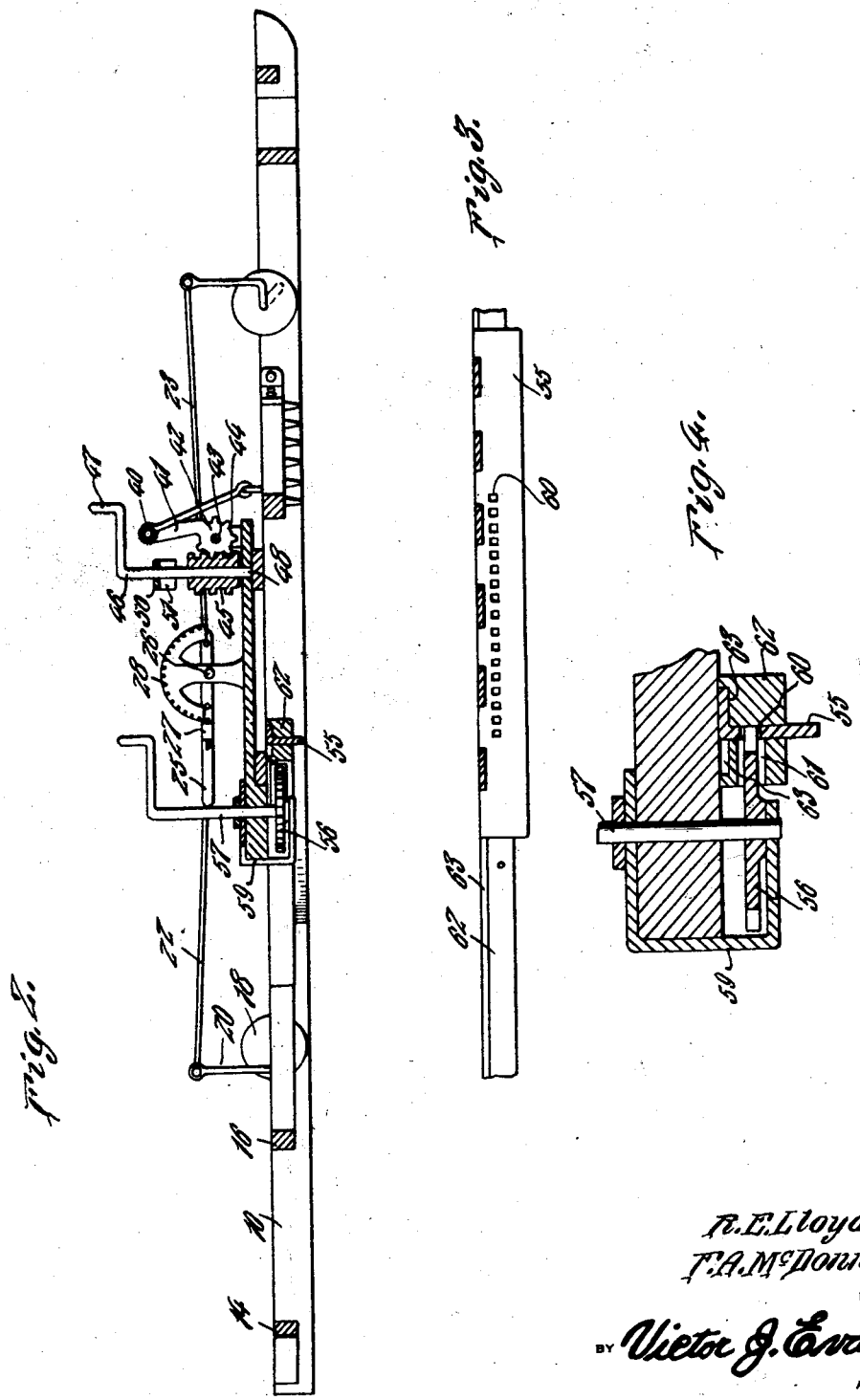

1,638,866

UNITED STATES PATENT OFFICE.

FRANCIS A. McDONNA, OF ENGLEVALE, AND RODGER E. LLOYD, OF VALLEY CITY, NORTH DAKOTA.

SCARIFIER AND ROAD PLANER.

Application filed November 27, 1925. Serial No. 71,713.

The object of this invention is to provide a machine which shall include a main frame, means for varying the elevation thereof, a toothed bar or bars extending across the frame and means controlling the elevation of the bars, and a blade or drag extending across the frame and controlled in the special manner hereinafter disclosed.

With the above and other objects in view, the invention consists in the novel construction and arrangement of elements, described, illustrated and claimed, it being understood that modifications may be made within the scope of the claims without departing from the spirit of the invention.

In the drawings forming part of this application.

Figure 1 is a top plan view of the machine.

Figure 2 is a vertical longitudinal section on line 2—2 of Figure 1.

Figure 3 is a section on line 3—3 of Figure 1, the side and transverse elements of the frame being omitted.

Figure 4 is a section on line 4—4 of Figure 1.

The main frame includes side bars 10 and 11, heavy transverse elements 12 and 13, near the center of the frame, and several transverse braces, such as end braces 14 and 15, and other braces 16 and 17 which may be positioned at about the angle shown.

The frame is carried on wheels such as 18, these wheels being mounted on crank axles 19, and the latter being under the control of upwardly extending arms 20. The wheels are controlled in pairs, for the purpose of varying the elevation of the frame above the surface of the ground, and connecting rods such at 22 and 23 connect the upwardly extending arms 20 on a given side of the frame, these rods 22 and 23 having connection with an operating lever 25. The lever is pivoted at 26, and the points of connection with the rods 22 and 23 are on opposite sides of the fulcrum 26, as will be readily seen from an inspection of the drawings. An engaging device or detent 27 cooperates with segment 28, and serves to maintain an adjusted position of the lever, and therefore of the crank axles and wheels. This construction is duplicated from the opposite side of the frame.

Bars 30 and 31 are connected at 32 and 33, by means of brackets 34 with the side elements of the frame, and these bars 30 and 31 are disposed at an obtuse angle at their approaching ends. The points of connection at 32 and 33 afford sufficient pivotal movement, or may be so constructed and mounted, to permit of the variation in position of the inner approaching ends of said bars. This variation in position or elevation is effected by means of links 38 connected by eye members 39 with bars 30 and 31, the links being further connected at their upper ends, and at the point 40 with an arm 41, an offset end of which is designated 42 and is rotatable about pivot 43, this element 42 being provided with teeth 44, so that the epuivalent of a combined lever and gear wheel is provided.

The toothed element or wheel just described, formed as part of arm 41, is controlled by screw 45 rotatable on a verticle axis and mounted on shaft 46 which may be rotated by a crank 47, for the purpose of changing the elevation of toothed bars 30 and 31 through the operation of arm 41 and links 38. The shaft or stem 46 is supported for rotary movement at the point 48, and the upper portion of the shaft is rotatable in an apertured portion of an element 50 extending longitudinally above the bar or member 13, and transversely of the machine.

The blade 55 is slidable transversely of the main frame, by means of toothed wheel 56 rigid on the vertical shaft 57 which shaft is rotatable by means of crank 58. A U-shaped bracket 59 shown in Figures 1 and 4 serves an obvious purpose in connection with the mounting of the shaft and wheel just referred to. The teeth of the wheel 56 engage the apertured portion 60 of the bar 55, whereby the equivalent and a rack and pinion mechanism is produced, for shifting the blade 55 along the mounting means thereof, shown in Figure 1 in plan, and in Figure 4 in vertical section. The blade extends between oppositely located bars 61 and 62, forming guiding and supporting elements, and the upper edge of the blade is offset in opposite directions and is slidable in channels 63 in the bars just mentioned.

It may be added that the element 50 and bars 51, 52 constitute a bridge, supported at opposite ends on longitudinal tie bars 53, and 54.

What is claimed is:—

1. A device of the character described,

Aug. 16, 1927.
P. M. MELTON
1,638,867
COTTON HARVESTER AND CLEANER
Filed Dec. 27, 1922   3 Sheets-Sheet 1
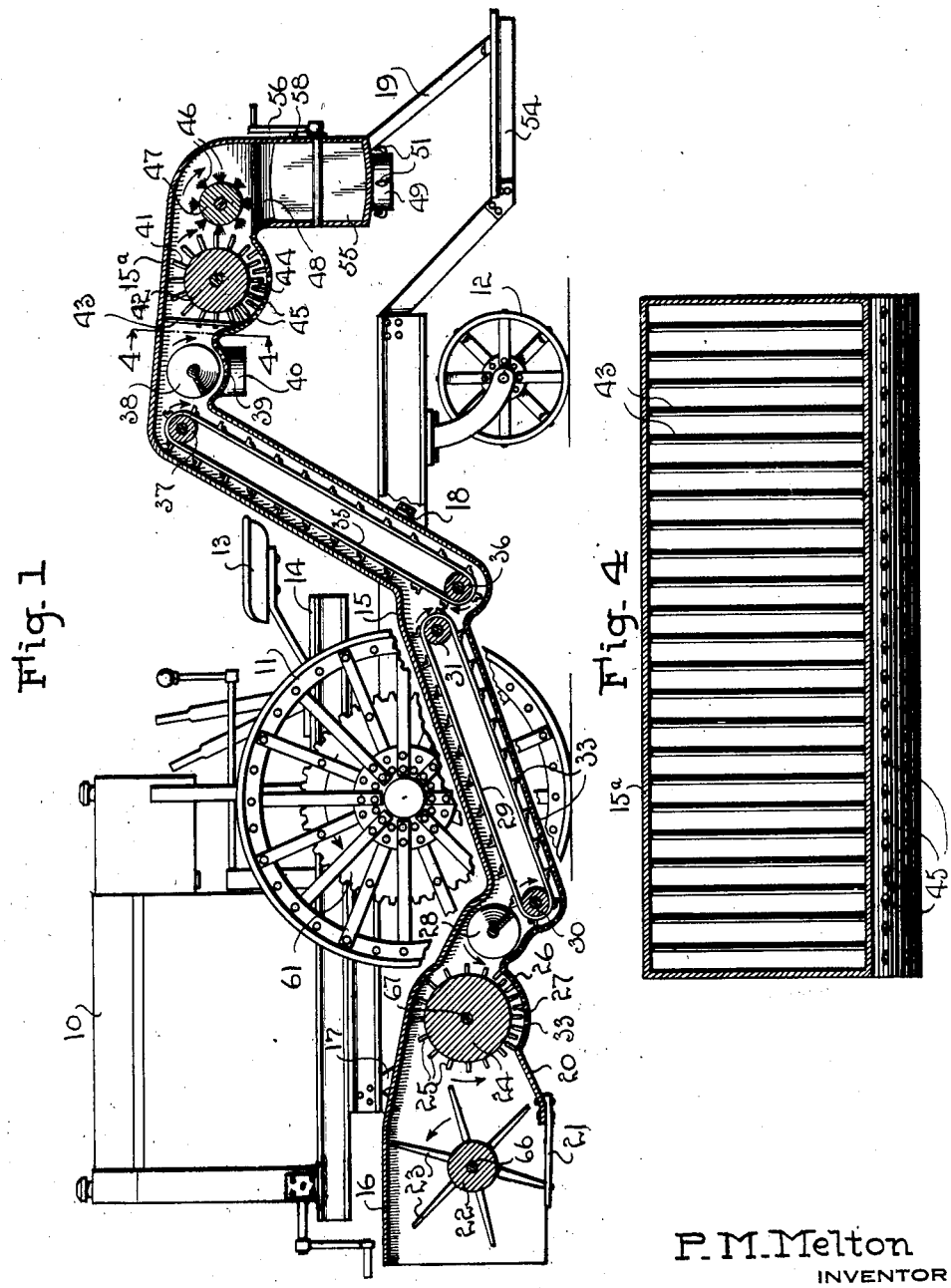
P. M. Melton
INVENTOR
WITNESSES
BY
ATTORNEY